TRANSISTOR EXCLUSIVE OR LOGIC CIRCUIT

Original Filed Oct. 29, 1953 2 Sheets-Sheet 1

INVENTOR.
HAROLD FLEISHER

BY Lester H. Clark

ATTORNEY 3,154,691

TRANSISTOR EXCLUSIVE OR LOGIC CIRCUIT

Harold Fleisher, Poughkeepsie, N.Y., assignor to International Business Machines Corporation, New York, N.Y., a corporation of New York Original application Oct. 29, 1953, Ser. No. 389,115, now Patent No. 2,903,602, dated Sept. 8, 1959. Divided and this application June 5, 1959, Ser. No. 818,468
28 Claims. (Cl. 307—88.5)

This application is a division of S.N. 389,115, filed October 29, 1953, now Patent No. 2,903,602, granted September 8, 1959.

This invention relates to logical circuits of the types known as non-commutative circuits and EXCLUSIVE OR circuits. A particular feature of the invention is the employment of transistors in such circuits, but certain features of the invention are not neecssarily limited to circuits employing transistors.

A logical circuit may be defined as a circuit having a plurality of inputs and a single output, which responds, upon the receipt of signals at only a certain distinctive combination or combinations of the inputs to produce a signal at its output. Signals of other combinations of the inputs produce no effect at the output. When the several inputs are controlled by separate conditions, such circuits provide a means for logical discrimination among the combinations of conditions.

While logical circuits may be used to adavntage in many situations, they have in particular been used extensively in high-speed computers. The input signals for such circuits are commonly of the pulse type, that is, the type in which the input current or potential shifts substantially instantaneously between two separated values.

One specific type of logical circuit is known as a non-commutative circuit in that only one combination of input signals will produce an output signal. Any change (commutation) from that particular input signal combination will terminate the output signal.

Another type of logical circuit has come to be known as an EXCLUSIVE OR circuit. This circuit produces an output pulse whenever an input pulse is received at any single one of its inputs, but not when input pulses are received simultaneously at a plurality of inputs.

Transistors have recently come into use as relay devices broadly capable of functions similar to those of electromagnetic relays, vacuum tubes, and other devices which respond to a small input signal to control a larger output signal. Transistor current and potential characteristics are quite different from those of electromagnetic relays and of vacuum tubes, and consequently transistors cannot be directly substituted for those other relay devices in any given circuit. While the ultimate function of such a circuit using one or more transistors may be broadly equivalent to the ultimate function of a vacuum tube circuit, the structures of the two circuits are typically quite different.

Transistors are preferred to vacuum tubes and electromagnetic relays for many circuit applications because of their low power requirements, small space requirements and comparatively rapid response to input signals. Such advantages of transistors are particularly desirable in the case of circuits used in high speed computers, which may require thousands of such relay devices. The advantages to be gained with respect to the power requirements and space requirements from the use of transistors in such apparatus as opposed to vacuum tubes are very obvious.

An object of the invention is to provide an improved non-commutative logical circuit.

Another object of the instant invention is to provide an improved logical circuit of the "EXCLUSIVE OR" type.

Another object of this invention is to provide improved logical circuits of the foregoing types which employ transistors.

The foregoing and other objects of the invention are attained by applying to a polarity sensitive means an input produced by providing two signal input means, each variable between a no-signal condition wherein it produces substantially no potential and a signal condition wherein it produces a substantially unidirectional output potential, and connecting the two signal input means in series with their signal potentials opposed.

In one modification of the invention disclosed herein, a single polarity sensitive means such as a transistor is connected across the two signal input means and is effective to produce an output signal in response to a potential of predetermined polarity across the two signal input means. The polarity sensitive means is effective to produce an output signal which logically distinguishes a combination of input states in which a particular one of the signal input means is in its no-signal condition and the other signal input means is in its signal condition. This modification of the invention is therefore a non-commutative logical circuit, because it produces an output signal in response to only one combination of input signals.

In another modification of the invention described herein two polarity sensitive means, more particularly two transistors, are connected in opposite phases across the two signal input means in series. Both transistors have their outputs connected to a common load. The two transistors and the two signal input means together serve to distinguish logically two combinations of input states, each characterized by the fact that only one, but not both, of the two signal input means is in its signal condition. This modification of the invention therefore serves as an EXCLUSIVE OR logical circuit.

Other objects and advantages of the invention will become apparent from a consideration of the following specification and claims, taken together with the accompanying drawings.

Figure 1:
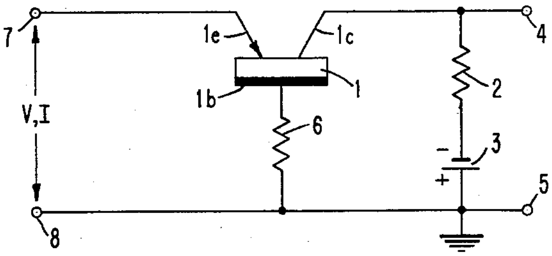
FIG. 1 is a wiring diagram of a transistor and its associated input and output circuits.

Considering now the circuit of FIG. 1 a transistor 1 has an emitter electrode 1*e*, a collector electrode 1*c* and a base electrode 1*b*. Collector electrode 1*c* is connected to a load resistance 2 in series with a battery 3 the opposite terminal of which is grounded. Collector electrode 1*c* is also connected to an output terminal 4. The other output terminal 5 is grounded. The base electrode 1*b* is connected through a resistor 6 to ground. The emitter electrode 1*e* is connected to an input terminal 7. The other input terminal 8 is grounded.

Figures 2, 3:
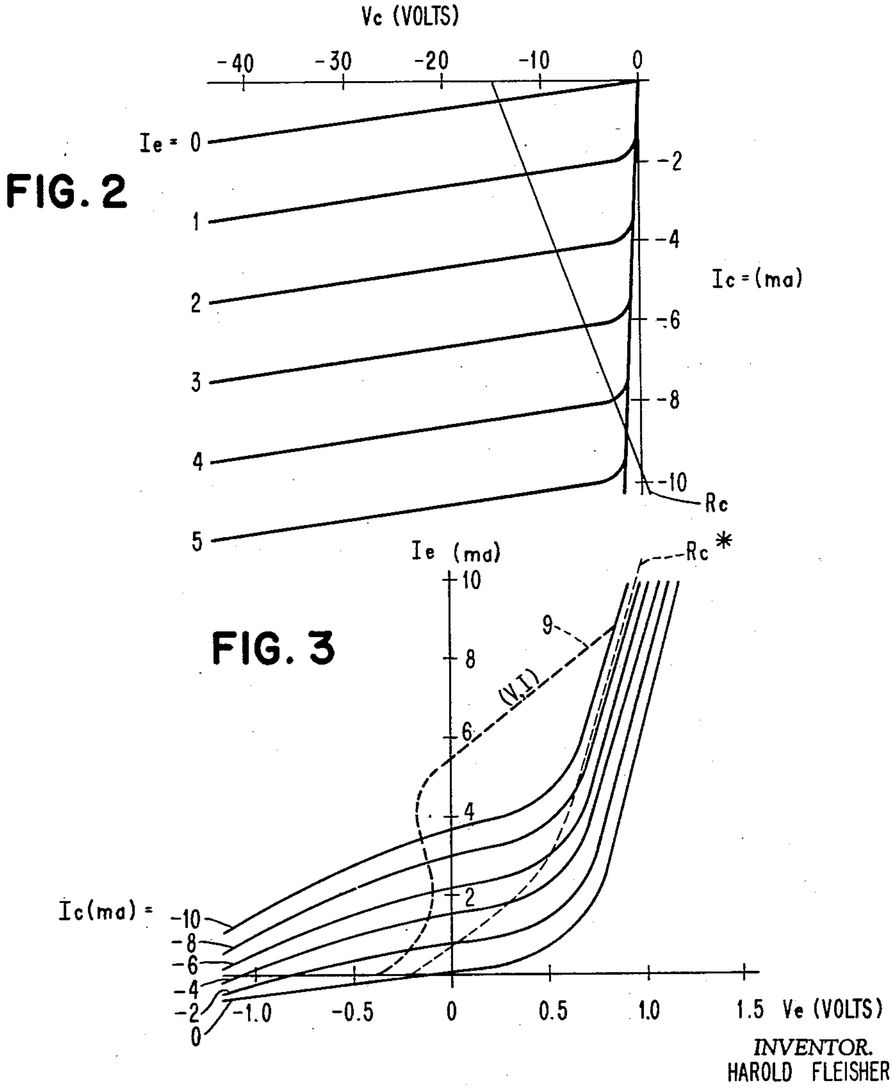
FIG. 2 is a graphical diagram illustrating the output characteristics of the transistor of FIG. 1.
FIG. 3 is a graphical diagram illustrating the input characteristics of the transistor of FIG. 1.

FIG. 2 shows a family of collector potential-current ($V_c$, $I_c$) output characteristic curves of the transistor 1. FIG. 3 shows a family of emitter potential-current ($V_e$, $I_e$) input characteristic curves of the transistor 1. FIG. 2 also shows a load line $R_c$, which represents the locus of all the operating points of the transistor 1 when the resistor 2 is connected between its output terminals. The load line $R_c$ has been transferred graphically to FIG. 3, where it is labeled $R_c$*.

The characteristics of FIGS. 2 and 3 are so-called "grounded base" characteristics. That is, they represent conditions existing when there is no impedance between the base and the positive terminal of battery 3. Note, however, that the circuit of FIG. 1 includes a resistor 6 connected in series with the base electrode. The effect of the resistor 6, on the operating points of the transistor is not shown in the characteristics of FIGS. 2 and 3 as described above. This effect may be determined from the characteristics just described in the following manner.

The emitter potential-current ($V_e$, $I_e$) characteristic of the emitter-to-base impedance is shown in FIG. 3 by the transferred load line $R_c$*. The potential drop across resistor 6 in FIG. 1 is the product of its resistance and the algebraic sum of the emitter current and the collector current. If a value of emitter current is assumed, the corresponding values of $V_e$ and $I_c$ may be determined from the intersection in FIG. 3 of that emitter current line with the transferred load line $R_c$*. The collector current and the emitter current being then both known, the potential drop across resistor 6 may be calculated and added algebraically to $V_e$. This yields V, which is the voltage a battery across the terminals 7, 8 (FIG. 1) must have in order to drive the current $I(I=I_e)$ through those terminals. A sequence of points may thus be obtained, which may be plotted on FIG. 3 as the curve 9 (labeled V, I). This curve is reproduced in FIG. 4.

Figure 4:
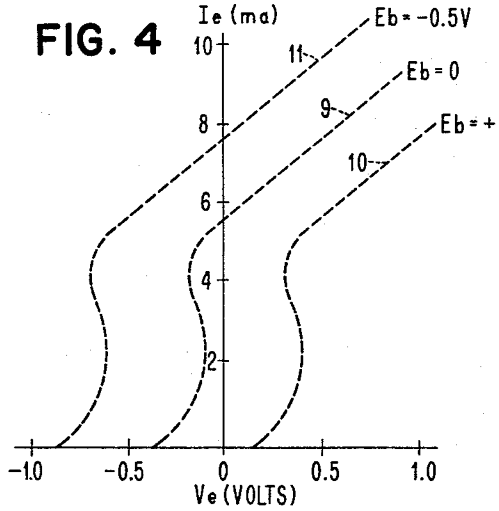
FIG. 4 is a graphical diagram illustrating the effect of varying biasing voltages in the characteristics of FIG. 3.
Figure 5:
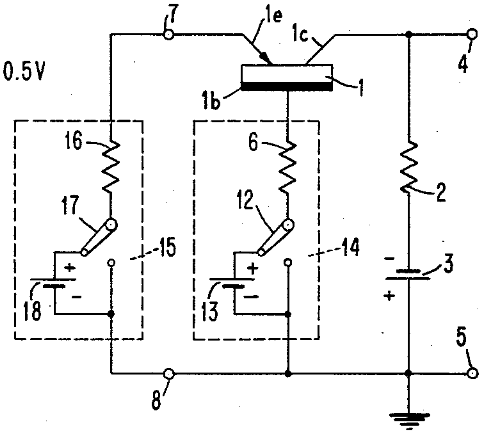
FIG. 5 is a wiring diagram similar to FIG. 1 illustrating a non-commutative logical circuit.

The insertion of a battery or other source of potential in series with resistor 6, as shown in FIG. 5, results in translating the curve 9 of FIGS. 5 and 4 along the voltage axis. For example, if a battery, $E_b$, having a terminal potential of 0.5 volt is connected in series with resistor 6 with its positive terminal nearest the base, the curve 9 would be shifted to the right where it appears in FIG. 4 as curve 10. If the battery $E_b$ of 0.5 volt had its negative terminal nearest the base, the curve 9 would be shifted to the position of curve 11.

Figure 6:
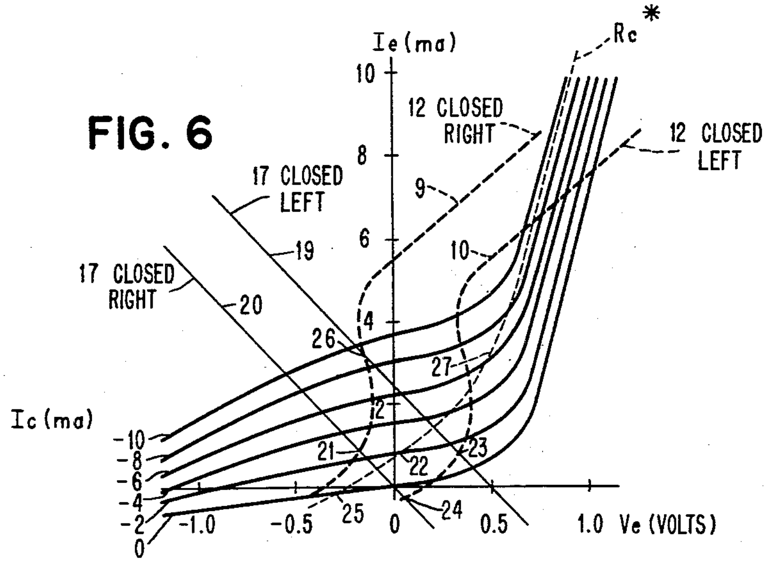
FIG. 6 is a graphical diagram showing the composite characteristics of the complete circuit of FIG. 5.

The circuit of FIG. 5 shows the circuit of FIG. 1 modified by the inclusion of switch 12 and battery 13 which, with resistance 6, constitute a signal generator 14, and an additional signal generator 15 having a resistance 16, connected between the emitter and ground. The circuit of FIG. 5 may be said to represent the circuit whose characteristics are drawn in FIG. 4 with another signal input added. The characteristics of the circuit of FIG. 5 are illustrated in FIG. 6. These characteristics will be recognized as the same family of emitter potential-current ($V_e$, $I_e$) input characteristic curves which appear in FIG. 3 with the addition of the curves 9 and 10 of FIG. 4 and with the addition of two load lines 19 and 20, representing the two operating conditions of the signal generator 15 of FIG. 5.

Load line 19 represents the locus of all possible operating conditions when the switch 17 of generator 15 is closed in its left-hand position and load line 20 represents the corresponding locus when switch 17 of generator 15 is closed in its right-hand position. Similarly load line 9 represents the locus of all possible operating conditions when the switch 12 of generator 14 is closed in its right-hand position, and load line 10 represents the corresponding locus when switch 12 is closed in its left-hand position. These relationships are indicated by suitable legends on FIG. 6.

It may be shown from the characteristics of FIG. 6 that the circuit of FIG. 5 produces an output signal only when the switch 17 of the signal generator 15 is closed in its left-hand position and the switch 12 of the signal generator 14 is closed in its right-hand position.

When the switches 12 and 17 of both the signal generators are closed in their right-hand positions, the emitter current and voltage are at the intersection of the curve 9 and the curve 20, namely, the point 21. The collector current is then determined by the point on the transferred load line $R_c$* for the same value emitter current, namely the point 22 in FIG. 6.

When both switches 12 and 17 are closed in their left-hand positions, the emitter current and potential for the transistor is determined by the intersection of the curves 10 and 19 in FIG. 6, namely the point 23. The collector current is then at substantially the same value as before, namely the value at the point 22. If the switch 17 of the signal generator 15 is in its right-hand position and switch 12 of signal generator 14 is closed in its left-hand position, then the emitter current and potential are determined by the intersection of curves 10 and 20, namely point 24 of FIG. 6. The collector current is the point on the load line $R_c$* for the same value of emitter current, namely the point 25 of FIG. 6.

It may be seen that the collector currents for all three of the operating conditions described above are low. Consider now the fourth possible operating condition, when the switch 17 of signal generator 15 is closed in its left-hand position and the switch 12 of signal generator 14 is closed in its right-hand position. The emitter current and voltage are then determined by intersection of curves 9 and 19, namely the point 26 of FIG. 6. The collector current is determined by the point on the load line $R_c$* for the same value of emitter current, namely the point 27 of FIG. 6. It may be seen that the collector current for this point is more than 6 ma. while the collector current for all the other operating points is less than about 2 ma.

Figure 7:
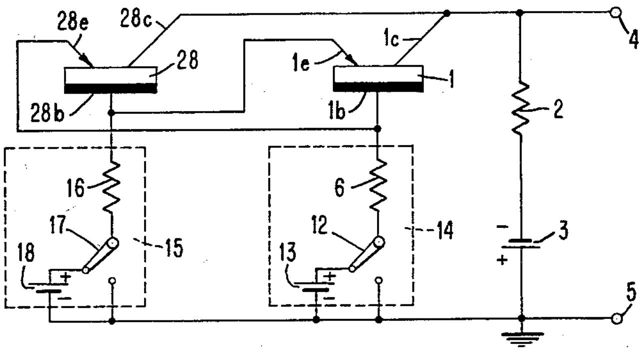
FIG. 7 is a wiring diagram illustrating an EXCLUSIVE OR circuit emboding certain features of the invention.

When the circuit of FIG. 5 is modified by the addition of a second transistor responsive to the same two signal generators, as shown in FIG. 7, it will readily be understood that the second transistor will produce a substantial output current only when the switch 12 of signal generator 14 is closed in its left-hand position and the switch 17 of signal generator 15 is closed in its right-hand position. Consequently, the circuit will operate as an EXCLUSIVE OR circuit, giving an output pulse when one only of the two signal generators supplies an input pulse, but not when both supply pulses and not when neither supplies a pulse.

FIG. 7 shows an EXCLUSIVE OR circuit including two transistors 1 and 28 respectively having emitter electrodes **1*e* and 28*e*, collector electrodes 1*c* and 28*c* and base electrodes 1*b* and 28*b*. Collector electrodes 1*c* and 28*c* are connected in parallel to an output circuit including a load resistance 2, a battery 3, and a pair of output terminals 4 and 5 connected between the collector electrodes and ground across the output circuit. The base electrode 28*b* of transistor 28 is connected through a signal generator 15 to ground. The base electrode 1*b* of transistor 1 is connected through a substantially equal signal generator 14 to ground. Each of the signal generators 14 and 15 is shown for purposes of illustration as comprising a resistor 6 or 16 and in series with that resistor a single-pole, double-throw switch 12 or 17, respectively, which in one position connects a battery 13 or 18 in series with resistor 6 or 16, and in its other position connects the resistor 6 or 16 directly to ground. The emitters, 1*e* and 28*e* are cross-connected to the base electrodes 28*b* and 1*b* of the other transistor, respectively. That is emitter electrode 1*e* is connected through a wire to base electrode 28*b* and emitter electrode 28*e* is similarly connected to base electrode 1*b***.

Output terminals 4 and 5 are connected to the opposite ends of the common external branch of the output circuit, which branch includes the load resistor 2 and the battery 3.

It may be seen that the signal generators 14 and 15 are connected in series opposition between the base electrodes **1*b* and 28*b*. They are also in series opposition in the connection which may be traced from emitter electrode 28*e* through generators 14 and 15 to base 28*b*, and in the corresponding connection between the emitter electrode 1*e* and base 1*b***. Under these conditions, with both switches 12 and 17 closed in their right-hand positions, connecting the resistors 6 and 16 directly to ground, any potential drops across the resistors 6 and 16 are in opposition in the respective input circuit branches to the transistors. The emitter electrodes are then substantially at the same potential as their respective bases, so that the emitter current is substantially cut off, and the output current is low.

If one only of the switches 12 or 17 is now closed in its left hand position, then the potential of its associated battery biases one of the emitter electrodes positive and the other negative. The one which is biased positive causes a substantial flow of collector current in its transistor, which appears in the common output circuit branch, and hence a signal appears at the output terminals 4 and 5.

If both switches 12 and 17 are closed in their left-hand positions, the potentials of the batteries 13 and 18 buck each other, and consequently both emitter electrodes remain at the same potential as their respective bases and no output signal is obtained.

It should be mentioned that the two transistors employed in FIG. 7 should have substantially identical characteristics.

In the various circuits illustrated, I have shown and described specific signal generator structures. My invention is in no way limited to the specific signal generator structures shown and described, but any electrically equilavent signal generator may be used in signal generator may be used in places thereof.

While the various features of the invention are described above as applied to circuits employing point contact transistors with N-type semi-conductive material, it will readily be recognized by those skilled in the art that the circuits could be modified to secure similar results with P-type semi-conductive material, in many cases by simply reversing the polarities of the potentials. Furthermore, the circuits could be modified to use junction transistors, either of the PNP or NPN types.

I claim:

1. A logical circuit comprising two electrical signal input means, each independently shiftable between first and second readily distinguishable signal conditions, means connecting said two signal input means in series with their signal potentials opposed, and polarity sensitive means connected across the series circuit of said two signal input means and effective to produce an output signal when one of said signal input means is in its first signal condition and the other signal input means is in its second signal condition.

2. A logical circuit as defined in claim 1 wherein an output signal is produced when and only when a particular one of said signal input means is in its first signal condition.

3. A logical circuit as defined in claim 1 wherein each of said signal input means produces substantially no output potential in its first signal condition and a substantial unidirectional output potential in its second signal condition.

4. A logical circuit comprising first and second electrical signal input means each independently shiftable between first and second readily distinguishable signal conditions, means connecting said first and second signal input means in series with their signal potentials opposed, first polarity sensitive means connected across the series circuit of said two signal input means and effective to produce an output signal when the first of said signal input means is in its first signal condition and the second signal input means is in its second signal condition, and second polarity sensitive means connected across the series circuit of said two signal input means and effective to produce an output signal when the first of said signal input means is in its second signal condition and the second signal input means is in its first signal condition.

5. A logical circuit as defined in claim 4 including a load device and means connecting said load device to both said polarity sensitive means so that an output signal at said load device distinguishes logically the combination of input state wherein either one, but not both, of the two signal input means is in its first signal condition.

6. A logical circuit comprising at least one transistor having input, output and common electrodes, a load circuit branch including a load impedance and a source of unidirectional electrical energy in series, means for taking an output from said load circuit branch, means connecting said load circuit branch between said output and common electrodes, an input circuit branch including two signal input means each independently shiftable between first and second readily distinguishable signal conditions, and means connecting said two signal input means in series with their signal potentials opposed between said input and common electrodes, said two signal input means being effective to apply a potential in the forward direction to the internal input-common impedance of the transistor when and only when the signal input means having its first signal potential in the forward polarity is in its first signal condition and the other signal input means is in its second signal condition.

7. A logical circuit comprising a first and a second transistor each having input, output and common electrodes, a load circuit branch including a load impedance and a source of unidirectional electrical energy in series, means for taking an output from said load circuit branch, means connecting said load circuit branch between the output and common electrodes of both transistors in parallel, an input circuit branch including two signal input means each independently shiftable between first and second readily distinguishable signal conditions, means connecting said two signal input means in series with their signal potentials opposed between the common electrodes of said first and second transistors, and means connecting the input electrode of each transistor to the common electrode of the other transistor, so that the first signal condition of one signal input means produces a potential which is in the forward polarity for one transistor and the first signal condition of the other signal input means produces a potential which is in the forward polarity for the other transistor, said two signal input means being effective to produce an output when either one but not both of the two signal input means is in its first signal condition.

8. A non-commutative logical circuit comprising a single transistor having input, output and common electrodes, a load circuit branch including a load impedance and a source of unidirectional electrical energy in series, means for taking an output from said load circuit branch, means connecting said load circuit branch between said output and common electrodes, an input circuit branch including two signal input means each independently shiftable between first and second readily distinguishable signal conditions, and means connecting said two signal input means in series with their signal potentials opposed between said input and common electrodes, said two signal input means being effective to apply a potential in the forward direction to the internal input-common impedance of the transistor and thereby to produce a signal at said output taking means when and only when the signal input means having its first signal potential in the forward polarity is in its first signal condition and the other signal input means is in its second signal condition.

9. A transistor EXCLUSIVE OR circuit comprising two transistors, each having a semi-conductive body, a base electrode, an emitter electrode and a collector electrode, all said electrodes being in conductive relationship with said body, input circuit branches for each of the transistors, all the input circuit branches being means connected to two corresponding electrodes of their respective transistors, two input signal pulse supplying means, means connecting both of said pulse supplying means in series opposition in the input circuit branches of both transistors, and an output circuit having a characteristic such that an output signal pulse is produced therein when an input signal pulse is supplied by either of said pulse supplying means, said opposed pulse supplying means counteracting each other when both supply pulses simultaneously, so that no output signal is then produced.

10. An EXCLUSIVE OR circuit comprising: first and second negative resistance devices having their outputs connected together and each device having two control elements responsive respectively to pulses of opposite polarities to produce an output of given polarity, a cross-connection from each control element to the non-corresponding control element of the other device, and means for applying a first input pulse to one control element of the first device and a second input pulse to the corresponding control element of the other device, whereby an output pulse is produced from the commonly connected outputs in response to a single input pulse applied to either input but not in response to simultaneous input pulses applied to both inputs.

11. An EXCLUSIVE OR circuit comprising: a load impedance, two translating devices, each presenting other than a positive input impedance over a portion of its operating range, each having its input connected to an output of the other, and each having an output connected to an output of the other and said load impedance, and means for applying a first input pulse to the input of one translating device and a second input pulse to the input of the other translating device, whereby an output pulse is produced across said load impedance in response to a single input pulse applied to either input but not in response to simultaneous input pulses applied to both inputs.

12. An EXCLUSIVE OR circuit comprising: bias means; a load impedance; first and second transistors, each having emitter, collector and base electrodes with the emitter electrode of each connected to the base electrode of the other and the two collector electrodes connected together and, through said load impedance, to said bias means; and means for applying a first input pulse between one base electrode and said bias means and a second input pulse between the other base electrode and said bias means; whereby an output pulse is produced across said load impedance in response to a single input pulse applied to either base electrode but not in response to simultaneous input pulses applied to both base electrodes.

13. An EXCLUSIVE OR circuit comprising: bias means; a load impedance; first and second transistors, each having a current amplification greater than one over at least a portion of its operating range and each having emitter, collector and base electrodes, with the emitter electrode of each connected to the base electrode of the other and the two collector electrodes connected together and, through said load impedance, to said bias means; and means for applying a first input pulse between one base electrode and said bias means and a second input pulse between the other base electrode and said bias means; whereby an ouput pulse is produced across said load impedance in response to a single input pulse applied to either base electrode but not in response to simultaneous input pulses applied to both base electrodes.

14. A transistor EXCLUSIVE OR circuit comprising a transistor having a base electrode, an emitter electrode and a collector electrode, an input circuit branch connected to two electrodes of the transistor, two input signal pulse supplying means, means connecting both of said pulse supplying means in series opposition in the input circuit branch, and an output circuit having a characteristic such that an output signal pulse is produced therein when an input signal pulse is supplied by either of said input pulse supplying means, said opposed pulse supplying means counteracting each other when both supply pulses simultaneously, so that no output signal is then produced.

15. A transistor circuit comprising a transistor having a semi-conductive body, and input, output and common electrodes in electrical contact with said body; an input circuit for said transistor including the internal asymmetrical impedance between said input electrode and said common electrode, and input signal means operable at times to transmit current to said impedance in the low impedance direction thereof, said input signal means comprising two independently operable signal means connected in series opposition between said input electrode and said common electrode; and an output circuit comprising a source of unidirectional electrical energy and a load impedance in series connected between the output electrode of said transistor and the junction of said two signal means.

16. The circuit of claim 15 wherein the input electrode is an emitter electrode, the output electrode is a collector electrode, and the common electrode is a base electrode of said transistor.

17. A logical circuit comprising a transistor having input, output and common electrodes, a load circuit branch including a load impedance and a source of unidirectional electrical energy in series, means for taking an output from said load circuit branch, a first input circuit branch connecting said load circuit branch between said output and common electrodes, and a second input circuit branch connecting said load circuit branch between said output and input electrodes, each of said input circuit branches including an independently operable signal input means shiftable between first and second readily distinguishable signal conditions, said signal input means being effective to produce an output signal at said output taking means when and only when one of said signal input means is in its first signal condition and the other signal input means is in its second signal condition, said signal conditions being effective to apply a potential in the forward direction to the internal input-common impedance of said transistor.

18. In combination, two transistors of the direct coupled transistor logic type, a first cross connection directly interconnecting the base of a first one of said transistors and the emitter of a second transistor, a second cross connection directly interconnecting the emitter of said first transistor and the base of said second transistor, a load resistor having one terminal directly connected to the collectors of both of said transistors, and individual circuit means for applying control voltages to said first and to said second cross connections.

19. In combination, two transistors having their base and emitter circuits directly cross connected, said transistors being of the direct coupled transistor logic type, individual circuits for applying control voltages to each of the cross connections, and a common load resistance connected to the collectors of both of said transistors.

20. In combination, two transistors of the direct coupled transistor logic type, a first cross connection directly interconnecting the base of a first one of said transistors and the emitter of the second transistor, a second cross connection directly interconnecting the emitter of said first transistor and the base of said second transistor, individual circuit means for applying control voltages to said first and to said second cross connections, and a common load resistor having one terminal connected to the collectors of both of said transistors.

21. In combination, at least two transistors of the direct coupled transistor logic type, individual coupling circuits directly intercoupling the emitter of each of said transistors with the base of another transistor, control circuits for applying signals to each of said coupling circuits, and a common load resistor having one terminal connected to the collectors of said transistors.

22. The combination as set forth in claim 21 further comprising means for applying energizing voltage to the collectors of said transistors through said common load resistor.

23. In combination, two transistors of the direct coupled transistor logic type, a first cross connection directly interconnecting the base of a first one of said transistors and the emitter of the second transistor, a second cross connection, directly interconnecting the emitter of said first transistor and the base of said second transistor, individual circuit means for applying control voltages to said first and to said second cross connections, a common load resistor having one terminal connected to the collectors of both of said transistors, and additional circuit means including a resistor connected to each of said cross connections for supplying base current to said transistors.

24. A gating circuit comprising: a first and second transistor, each having a base electrode, an emitter electrode, and a collector electrode; a first source of binary signals connected to the base of said first transistor and the emitter of said second transistor; a second source of binary signals connected to the emitter of the first transistor and the base of the second transistor; a common resistor connecting the collectors of both said transistors to a potential source; and an output lead connected to said collectors.

25. A circuit for generating an exclusive "or" function comprising: a first and second p-n-p transistor, each having a base electrode, an emitter electrode, and a collector electrode; a first source of binary signals connected to the base of said first transistor and the emitter of said second transistor; a second source of binary signals connected to the emitter of the first transistor and the base of the second transistor; a common resistor connecting the collectors of both said transistors to a low potential; and an output lead connected to said collectors having signals thereon representative of an exclusive "or" function.

26. A circuit for generating an exclusive "or" logical function, comprising: a first and a second transistor each having a base, an emitter, and a collector; a first input terminal connected to the emitter of said first and the base of said second transistor; a second input terminal connected to the base of said first and the emitter of said second transistor; a resistor connecting both the collectors of said first and second transistors to a potential source; an output terminal connected to the junction of said resistor and the collectors of said first and second transistors; and a source of input signals having either a high or low potential connected to each of said first and second input terminals; whereby the potentials simultaneously applied to said first and second input terminals cause either one of said transistors to conduct current through said resistor or neither transistor to conduct, thus resulting in either a high or a low potential being supplied on said output terminal.

27. A logical gating circuit comprising: a first and second transistor, each having a base electrode, an emitter electrode, and a collector electrode; a common resistor connecting the collectors of both said transistors to a potential source; an output lead connected to said collectors; and sources of binary signals representing terms to be logically combined connected to the emitters and bases of said transistors, said binary signals having such potential values that one or the other transistor, but not both, can conduct through said resistor, to thereby generate a signal representing a logical "and" combination of the term represented by the signal on the emitter and the inverse of the term represented by the signal on the base of the conducting transistor.

28. A gating circuit comprising: a first and a second transistor, each having a base electrode, an emitter electrode, and a collector electrode; a first source of binary signals connected to the base of said first transistor and the emitter of said second transistor; a second source of binary signals connected to the emitter of the first transistor and the base of the second transistor; a common resistor connecting the collectors of both said transistors to a potential source; and an output lead for binary signals connected to said collectors, said gating circuit arranged such that the binary signals on said output lead are capable of sustaining a load while maintaining a voltage swing between upper and lower potential levels.

References Cited in the file of this patent

UNITED STATES PATENTS

| | | |
|---|---|---|
| 2,670,445 | Felker | Feb. 23, 1954 |
| 2,676,271 | Baldwin | Apr. 20, 1954 |
| 2,694,521 | Newman et al. | Nov. 16, 1954 |
| 2,708,720 | Anderson | May 17, 1955 |